(12) United States Patent
Birk et al.

(10) Patent No.: US 11,860,757 B2
(45) Date of Patent: Jan. 2, 2024

(54) APPARATUS AND METHOD FOR DETERMINING THE PERFORMANCE IMPACT OF CHANGES IN A COMPUTING SYSTEM

(71) Applicant: Lakeside Software, LLC, Bloomfield Hills, MI (US)

(72) Inventors: Lawrence J. Birk, Ann Arbor, MI (US); Michael A. Klingbeil, Roseville, MI (US); Robert William Koehler, Southfield, MI (US)

(73) Assignee: Lakeside Software, LLC, Bloomfield Hills, MI (US)

( * ) Notice: Subject to any disclaimer, the term of this patent is extended or adjusted under 35 U.S.C. 154(b) by 67 days.

(21) Appl. No.: 17/358,620

(22) Filed: Jun. 25, 2021

(65) Prior Publication Data
US 2022/0114071 A1  Apr. 14, 2022

Related U.S. Application Data

(60) Provisional application No. 63/090,007, filed on Oct. 9, 2020.

(51) Int. Cl.
*G06F 11/34* (2006.01)
*G06F 11/30* (2006.01)
*G06F 11/32* (2006.01)

(52) U.S. Cl.
CPC ...... *G06F 11/3409* (2013.01); *G06F 11/3006* (2013.01); *G06F 11/3075* (2013.01); *G06F 11/328* (2013.01)

(58) Field of Classification Search
CPC ............. G06F 11/3409; G06F 11/3006; G06F 11/3075; G06F 11/3072; G06F 11/32; G06F 11/324; G06F 11/328
See application file for complete search history.

(56) References Cited

U.S. PATENT DOCUMENTS 7,865,499 B2    1/2011  Schumacher
2015/0095892 A1*  4/2015  Baggott .............. G06F 11/3616
                                                717/127

(Continued)

*Primary Examiner* — Manuel L Barbee
(74) *Attorney, Agent, or Firm* — Dykema Gossett PLLC

(57) ABSTRACT

A method for generating an output for performance impact assessment of a change includes determining changes associated with a first managed computer system where corresponding change records includes a respective change time-stamp, determining performance values for a performance metric for predetermined times and associating respective performance time-stamps, selecting one of the changes wherein the selected change has a change time-stamp, identifying first performance values with performance time-stamps that are prior in time to change time-stamp and associating them with a before-change category, identifying second performance values with performance time-stamps that are later in time relative to the change time-stamp and associating them with an after-change category, and generating an output with the first and second performance values (in a tabular or common timeline format) with the first performance values being distinguishable from the second performance values to thereby allow the user to determine before/after performance impact of the selected change.

19 Claims, 10 Drawing Sheets

(56) References Cited

U.S. PATENT DOCUMENTS

| | | | |
|---|---|---|---|
| 2015/0229546 A1* | 8/2015 | Somaiya | H04L 67/10 |
| | | | 715/736 |
| 2016/0127204 A1* | 5/2016 | Ozaki | H04L 67/10 |
| | | | 709/224 |
| 2018/0060422 A1 | 3/2018 | Wegryn et al. | |
| 2020/0257606 A1 | 8/2020 | Schumacher | |
| 2022/0138068 A1* | 5/2022 | Dal Zotto | G06F 11/302 |
| | | | 714/47.1 |

* cited by examiner

APPARATUS AND METHOD FOR DETERMINING THE PERFORMANCE IMPACT OF CHANGES IN A COMPUTING SYSTEM

CROSS-REFERENCE TO RELATED APPLICATIONS

This application claims the benefit of U.S. provisional application No. 63/090,007, filed 9 Oct. 2020 (the '007 application), which is hereby incorporated by reference as though fully set forth herein.

BACKGROUND a. Technical Field

The instant disclosure relates generally to an apparatus and method for determining the performance impact of changes in a computing system.

b. Background Art

This background description is set forth below for the purpose of providing context only. Therefore, any aspects of this background description, to the extent that it does not otherwise qualify as prior art, is neither expressly nor impliedly admitted as prior art against the instant disclosure.

It is known to provide a workspace analytics system having data collection/analysis functionality by using a commercial product available under the trade designation SYSTRACK from Lakeside Software, LLC, Bloomfield Hills, Michigan USA. In an embodiment, the SYSTRACK analytics platform provides enterprise IT with the business intelligence to address a broad set of operational and security requirements, empowering them to make better decisions, dramatically improve productivity and reduce costs. Further details of an exemplary workspace analytics system may be seen by reference to U.S. application Ser. No. 11/268,012 (the '012 application), now U.S. Pat. No. 7,865,499, entitled "SYSTEM AND METHOD FOR MANAGING INFORMATION FOR A PLURALITY OF COMPUTER SYSTEMS IN A DISTRIBUTED NETWORK" and U.S. application Ser. No. 15/629,189 (the '189 application), published as US PG PUB 2018/0060422, entitled "METHOD AND APPARATUS FOR NATURAL LANGUAGE QUERY IN A WORKSPACE ANALYTICS SYSTEM". Additionally, U.S. application Ser. No. 16/669,630, filed Oct. 31, 2019 (the '630 application), entitled "APPARATUS AND METHOD FOR DETERMINING THE UNDERLYING CAUSE OF USER EXPERIENCE DEGRADATION", was published under U.S. patent publication no. 2020/0257606 on Aug. 13, 2020. The '012 application, the '189 application, and the '630 application are all hereby incorporated by reference as though fully set forth herein.

Lakeside Software's SYSTRACK product provides digital experience monitoring for Windows, Mac, Linux, Android, ChromeOS, and iOS devices, for example only. The computing systems that underlie these devices are very complex systems. They include hardware and firmware components, operating system software, drivers and kernel components, software packages and applications, and a myriad of configuration settings and data. Configuration and settings may also be changed frequently.

In large-scale enterprises, there is a desire for visibility into the impact of changes made to such computing systems and infrastructure. For example, if a new software package is installed or a new network card is adopted, being able to evaluate the impact of that change on end users is extremely valuable. Such changes, however, are often rolled out in stages and the ability to isolate the impact of a specific change that has occurred at different times for different systems is difficult. Companies will often rely on anecdotal or incomplete data in evaluating the performance impact of such changes.

The foregoing discussion is intended only to illustrate the present field and should not be taken as a disavowal of claim scope.

SUMMARY

The instant disclosure describes one or more embodiments of a method and apparatus for generating an output suitable for assessing the performance impact of changes, including changes made across many different managed computer systems. Embodiments consistent with the instant disclosure are configured to generate an output relating to a vast number of common and unique changes happening at different times on different systems where the output allows discovery of the impact, if any, on a myriad of performance measurements. Such output may comprise performance values that are presented in a before-change versus after-change comparison, such as in a tabular format and/or common timeline format.

In an embodiment, a method is provided for generating an output for facilitating assessment of a performance impact of a change in one or more managed computer systems. The method includes determining changes associated with a first managed computer system of the one or more managed computer systems and storing, in a first data store, change records corresponding to the determined changes. Each of the change records includes a respective change time-stamp indicating when each change occurred or was determined to have occurred. The method further includes determining a plurality of performance values for at least one performance metric associated with the first managed computer system for predetermined times and associating with each of the performance values a respective performance time-stamp. The method still further comprises selecting one of the determined changes for change impact assessment, wherein the selected change has an associated selected change time-stamp. The method further comprises identifying first performance values from the plurality of performance values that have performance time-stamps that are prior in time to the selected change time-stamp and associating such first performance values with a before-change category. The method further comprises identifying second performance values from the plurality of performance values that have performance time-stamps that are later in time relative to the selected changed time-stamp and associating such second performance values with an after-change category. The method also includes generating an output comprising such first and second performance values (e.g., in a tabular format or in a common timeline format) wherein the first performance values associated with the before-change category are distinguished from the second performance values associated with the after-change category, to thereby allow the user to determine the performance impact of the selected change using the before versus after output.

An apparatus is also presented.

The foregoing and other aspects, features, details, utilities, and advantages of the present disclosure will be apparent

DETAILED DESCRIPTION

Figure 1:
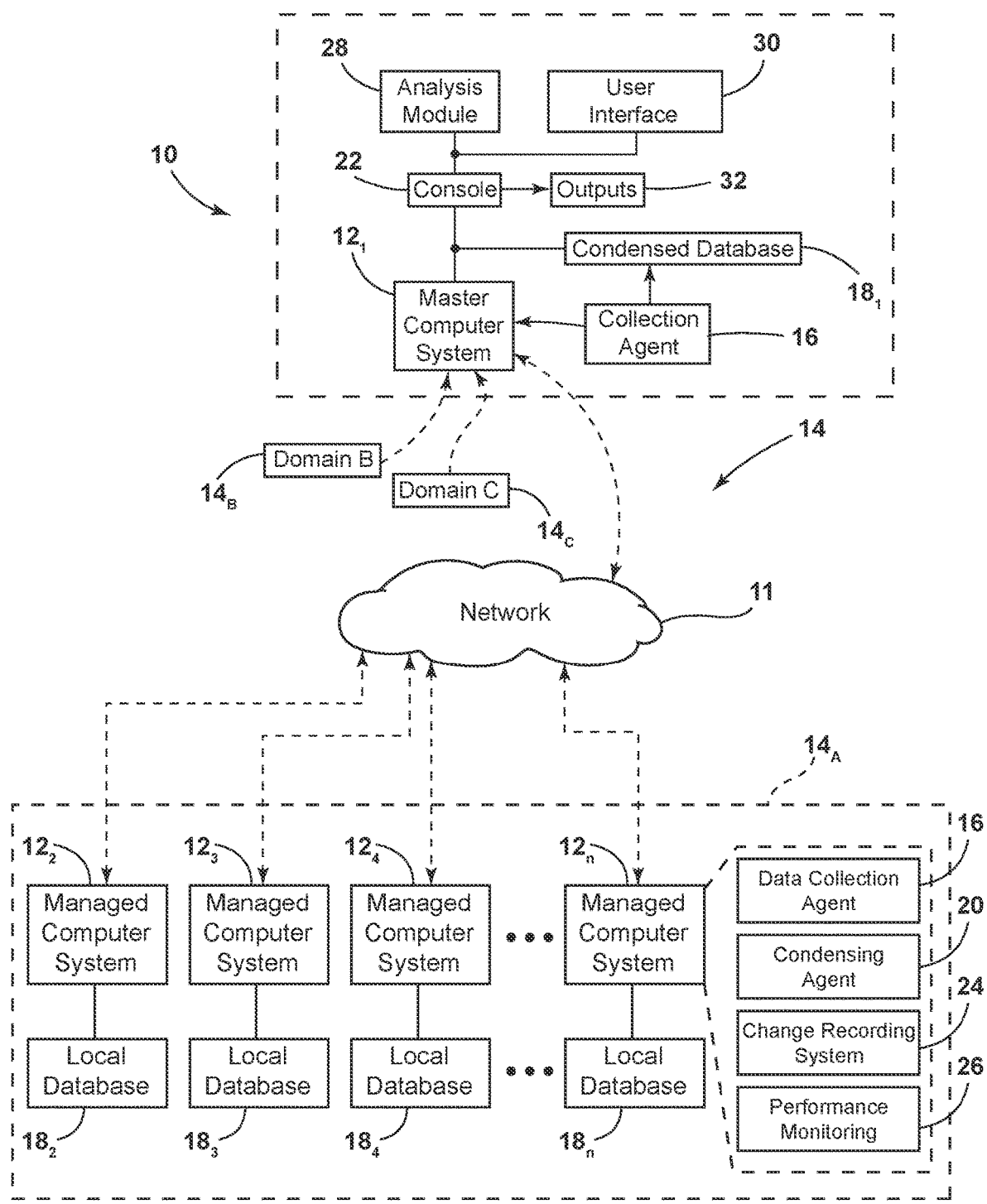
FIG. 1 is a diagrammatic and block diagram view of a distributed computing network in which embodiments consistent with the instant disclosure may be implemented.

Various embodiments are described herein to various apparatuses, systems, and/or methods. Numerous specific details are set forth to provide a thorough understanding of the overall structure, function, manufacture, and use of the embodiments as described in the specification and illustrated in the accompanying drawings. It will be understood by those skilled in the art, however, that the embodiments may be practiced without such specific details. In other instances, well-known operations, components, and elements have not been described in detail so as not to obscure the embodiments described in the specification. Those of ordinary skill in the art will understand that the embodiments described and illustrated herein are non-limiting examples, and thus it can be appreciated that the specific structural and functional details disclosed herein may be representative and do not necessarily limit the scope of the embodiments, the scope of which is defined solely by the appended claims.

Reference throughout the specification to "various embodiments," "some embodiments," "one embodiment," or "an embodiment," or the like, means that a particular feature, structure, or characteristic described in connection with the embodiment is included in at least one embodiment. Thus, appearances of the phrases "in various embodiments," "in some embodiments," "in one embodiment," or "in an embodiment," or the like, in places throughout the specification are not necessarily all referring to the same embodiment. Furthermore, the particular features, structures, or characteristics may be combined in any suitable manner in one or more embodiments. Thus, the particular features, structures, or characteristics illustrated or described in connection with one embodiment may be combined, in whole or in part, with the features, structures, or characteristics of one or more other embodiments without limitation given that such combination is not illogical or non-functional.

Overview. Embodiments of the instant disclosure generally facilitate determining the performance impact of a selected change in one or more managed computer systems, and includes three main components: (i) a first component that is configured to track changes to individual managed computer systems and consolidate the resulting change data into a single, centralized master repository—this first component may involve functionality at the managed computer system level in addition to functionality at a master computer system level; (ii) a second component that is configured to aggregate performance measurements (values), for example daily, across the plurality of managed computer systems and to consolidate the respective performance data into the master repository—this second component also may involve functionality at the managed computer system level in addition to functionality at the master computer system level; and (iii) a third component that is configured to generate an output (e.g., before-change versus after-change) to allow a user to determine a performance impact, if any, for a user-selected change to one or more of the managed computer systems.

Generally, embodiments in accordance with the instant disclosure may include features such as a basic data collection feature that is the same or similar to that of a workspace analytics system with data collection/analysis functionality but extended in a number of areas as described herein. For example, such a workspace analytics system may be seen by reference to a commercial product available under the trade designation SYSTRACK from Lakeside Software, LLC, Bloomfield Hills, Michigan USA, and as described above and as set forth in the '012 application, the '189 application, and the '630 application, identified herein and wherein the '012 application, the '189 application, and the '630 application are all hereby incorporated by reference as though fully set forth herein.

Referring now to the drawings wherein like reference numerals are used to identify identical components in the various views, FIG. 1 shows an illustrated embodiment of an apparatus 10 for generating an output for facilitating assessment of a performance impact of a change in one or more managed computer systems. In an embodiment, apparatus 10 may be deployed in a distributed computing network, designated generally as a network 14. The distributed computing network 14 may include a plurality of computer systems designated $12_1, 12_2, \ldots 12_n$ and may be of the type installed in one or more domains, such as Domain A, designated $14_A$, Domain B, designated $14_B$, and Domain C, designated $14_C$. FIG. 1 also shows a communications network 11 through and over which one or more of the managed computer systems and the master computer system may communicate or otherwise transmit/transfer data/information.

The computer systems $12_1, 12_2, \ldots 12_n$ may be, but are not required to be, arranged in an hierarchical relationship wherein computer $12_1$ may be a top-level master node at a headquarters (HQ) or main location and hereinafter sometimes referred to as a master computer system $12_1$. In another embodiment, the top-level master node may be accessible via the internet in a cloud computing model.

The computer systems $12_2, 12_3, 12_4, \ldots 12_n$ may comprise workstation type computer systems or server type computer systems, or may be another type of computing device. It should be understood however that embodiments consistent with the instant disclosure can be applied to a wide range of managed computer systems such as tablet computers, phone (smart phones), and various other dedicated computing hardware. In other words, managed computer systems is contemplated to be a broad term. The managed computer systems $12_2, 12_3, 12_4, \ldots 12_n$ may hereinafter sometimes be referred to as local or managed computer systems (also sometimes called a "child" computer system or alternatively a managed device). It should be understood that the number of managed computer systems shown in FIG. 1 is exemplary only and embodiments consistent with the instant disclosure are not so limited and may be applicable to a very large number of managed computer systems. Moreover, the managed computer systems are not limited to physically different hardware. Further descriptions of exemplary managed computer systems $12_2, 12_3, 12_4, \ldots 12_n$ may be found elsewhere in this document.

Each of the managed computer systems $12_2, 12_3, 12_4, \ldots 12_n$ may include (i) a respective data collection agent 16 (e.g., shown in exemplary fashion for managed computer system $12_n$), (ii) a respective local (or child) managed data store such as databases $18_2, 18_3, 18_4, \ldots 18_n$, (iii) a respective condenser module 20 configured to operate as a condensing agent 20, shown in exemplary fashion for managed computer system $12_n$, a change recording system 24, shown in exemplary fashion for managed computer system $12_n$, and a respective performance monitoring (measurement) module or system 26, shown in exemplary fashion for managed computer system $12_n$.

Figure 7A:
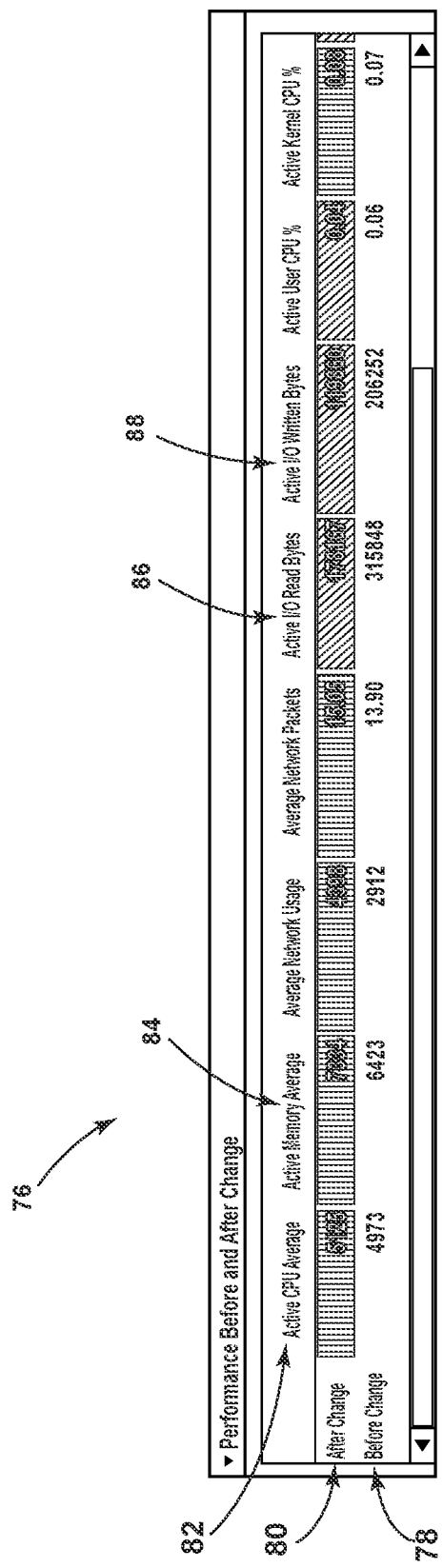
FIGS. 7A-7B are simplified screenshot views showing in a tabular format, before-change versus after-change performance values of various performance metrics due to a change, in two embodiments.
Figure 7B:
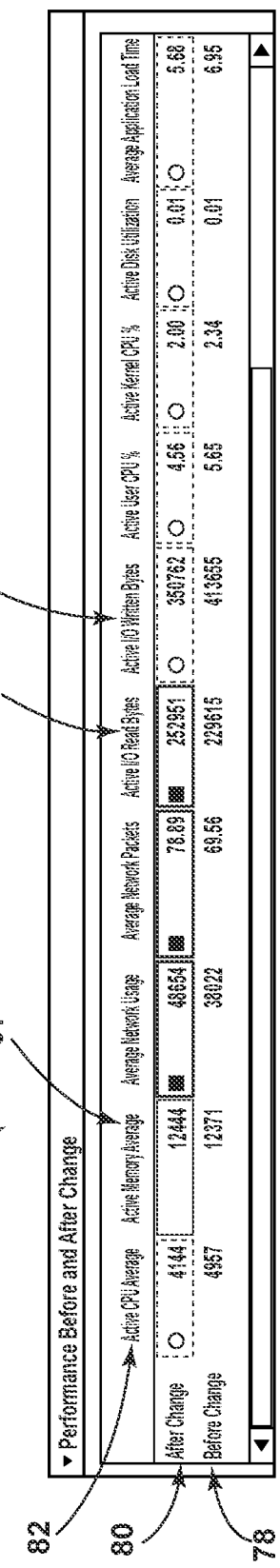
Figure 8:
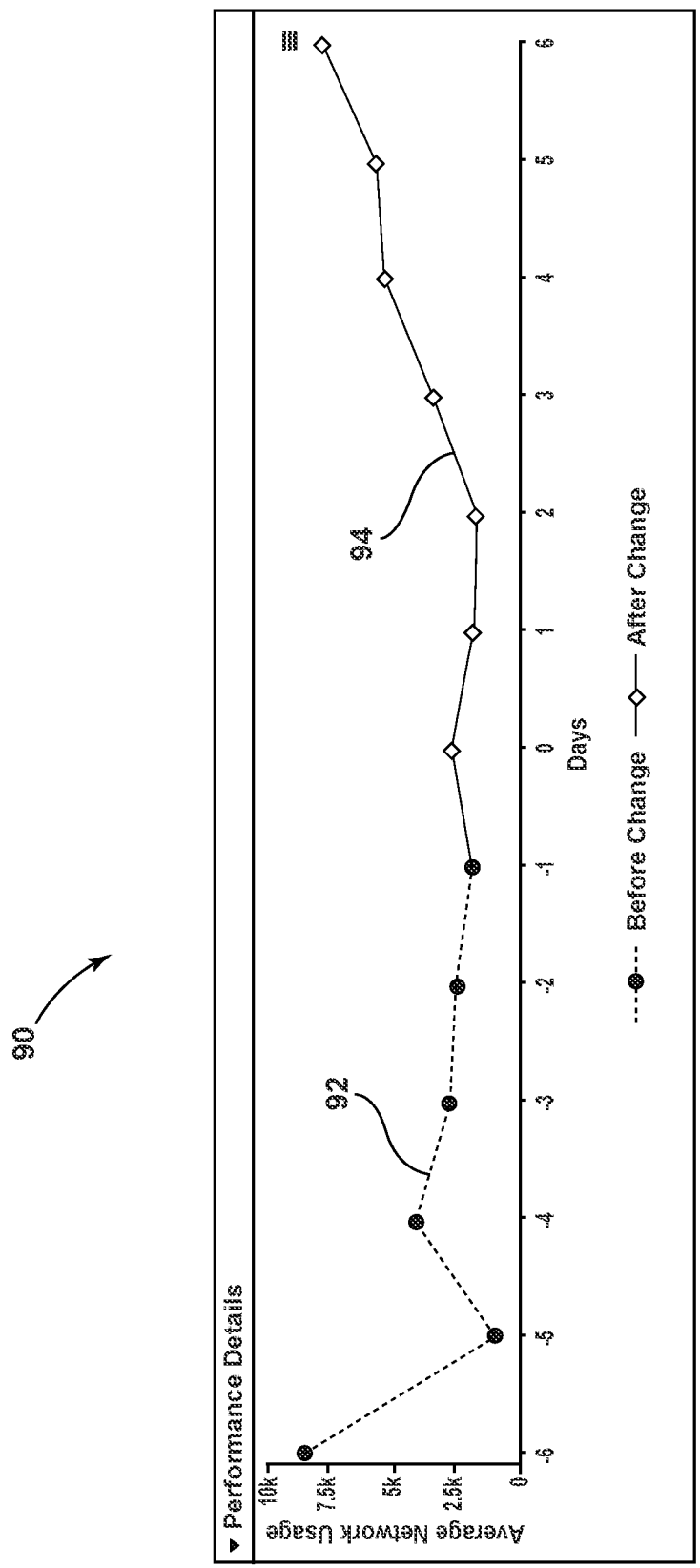
FIG. 8 is a simplified screenshot view of a chart illustrating a before-change versus after-change daily trend on a common timeline of a selected performance metric averaged across all the managed computer systems, given a user-selected change to evaluate, in an embodiment.
Figure 9:
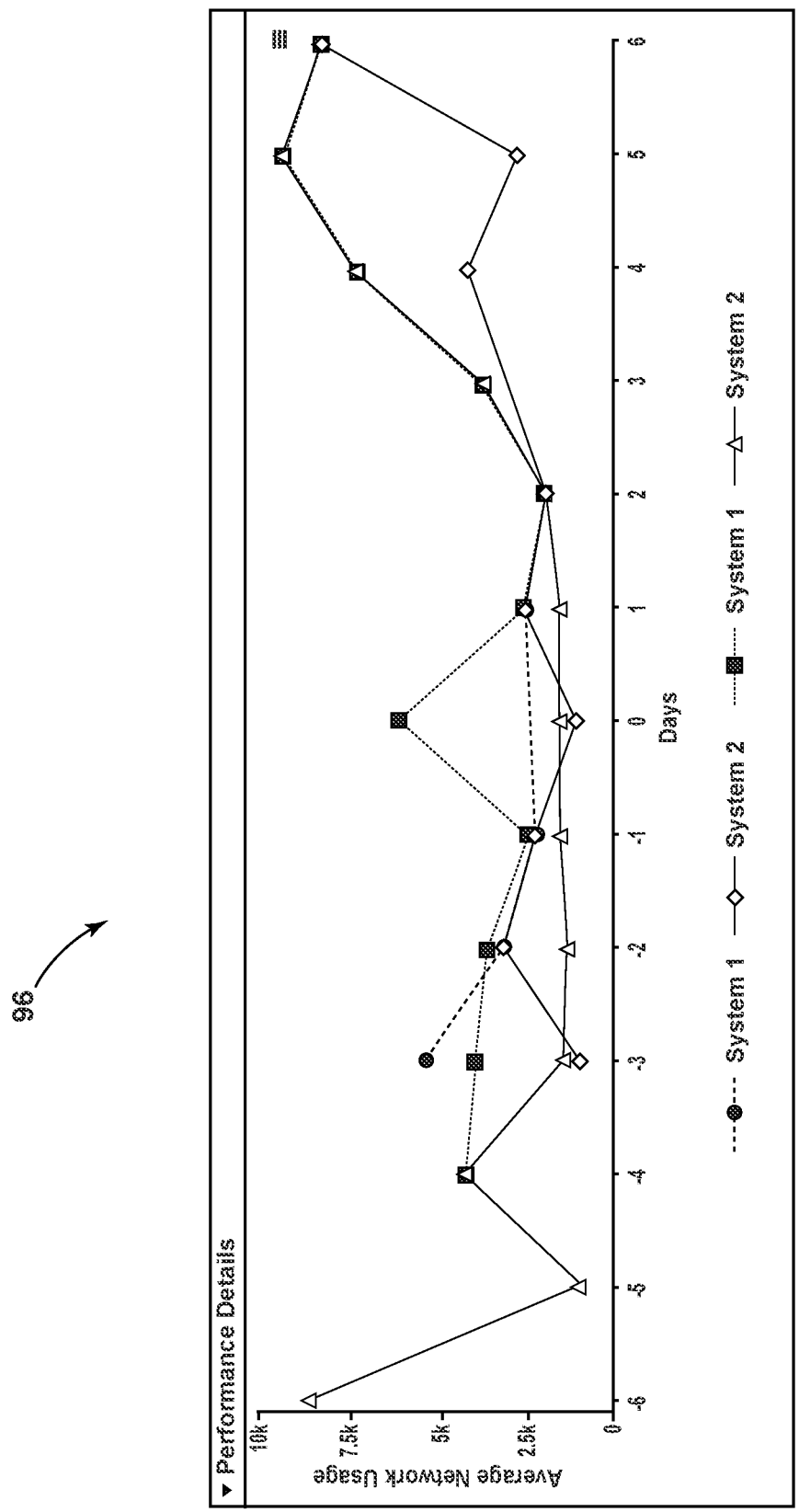
FIG. 9 is a simplified screenshot view of a chart illustrating a before-change versus after-change daily trend on a common timeline of a selected performance metric, for a plurality of managed computer systems, given a user-selected change to evaluate, in an embodiment.

The master computer system $12_1$ may include an optional console module 22, an analysis module 28, a user interface 30, and an output block designated as output block 32, which in an embodiment may take the form of various reports and/or a presentation of one or more multi-device views of relevant before-change versus after-change data, such as for example only as illustrated in FIGS. 7-9. Such output 32 that contains before-change versus after-change performance data as a result of a given change in one or more managed computer system(s) allows the user to evaluate a performance impact of such change. The output 32 may include both displayed format outputs as well as electronic format file(s) containing the above-referenced information.

The data collection agent 16 is configured to collect original data, which includes at least inventory data (e.g., data or information that is generally static in nature), operating data, and modified data, all designated by reference numeral 38 (best shown in FIG. 2), which data is associated with various components and operation of a managed computer system $12_i$ (where i is 2 to n) with which the data collection agent 16 is associated. The collected original data 38 may further include, without limitation, performance data, configuration data, hardware and software inventory data, as well as information about the relationships between various entities, as well as time-stamp information as described herein. Entities may include user names, application names, system names, domain names, disk names, network interfaces, and other items relevant within the workspace analytics system. The data collection agent 16 is also configured to record the captured data into a data store such as the local/managed databases $18_2, 18_3, 18_4, \ldots 18_n$.

Each local database $18_2, 18_3, 18_4, \ldots 18_n$ may be associated with a respective one of the managed computer systems $12_2, 12_3, 12_4, \ldots 12_n$. In an embodiment, the local databases $18_i$ (where i is 2 to n) may reside (i.e., where the data is saved) directly on the managed computer system $12_i$ with which it is associated, although it should be understand that the local databases may also be stored in shared storage, on a server, in a cloud storage facility, and/or in another place. In a typical embodiment, each of the local databases $18_i$ may be dedicated to its respective single managed computer system $12_i$ (or a single user thereof), although the sharing of such databases may also be possible.

The condenser module 20 is installed on each managed computer and is configured to operate as a condensing agent 20, including taking the original data/inventory data/modified data/other data stored in the local database $18_i$ as an input and performing a variety of operations designed to reduce its overall volume to produce condensed data. The condensing agent 20 is further configured to transmit the condensed data to an aggregation point, which may be the condensed database $18_1$.

The condensed database $18_1$ contains condensed data originating from the condensing agents 20 running on the managed computer systems $12_i$. The master computer system $12_1$ is configured (e.g., via software executing thereon) to receive such condensed data from the managed computer systems and may be configured to operate on such received condensed data, and store it in the condensed database $18_1$. The condensed database $18_1$ itself may exist partially on storage systems and partially in the memory on the master computer system $12_1$.

In embodiments, the information stored in the condensed database $18_1$ includes, among other things, change records relating to the changes that have occurred on one or more of the managed computer systems $12_2, 12_3, 12_4, \ldots 12_n$, as well as various performance values relating to performance metrics or other performance indicators indicative of performance of a managed computer system, wherein the change records and the performance data (i.e., values) are both time-stamped for purposes to be described herein.

The change recording system 24 that is included on each managed computer system $12_i$ is configured to evaluate original data 38, including the inventory data, that is stored in the local database by the data collection agent 16. Since changes to hardware, software, configuration settings and the like may lead to various problems including performance issues in the operation of the managed computer system, the change recording system 24 is included as a mechanism to identify such changes. In an embodiment, the change recording system 24 may make a record (e.g., in the form of change records) of at least (i) what changes have occurred in the managed computer system and (ii) when (i.e., the time) such changes were detected, which may take the form of a time-stamp. The time of a change can be used, in an embodiment, to indicate a reference time for determining before-change versus after-change performance impact, as explained in greater detail herein. In a constructed embodiment, the change recording system 24 may operate on the managed computer system $12_i$, although it would be possible to perform that work externally in other computing devices, in other embodiments.

The performance monitoring system 26 is configured generally to determine a plurality of performance values for one or more performance indicators/metrics/parameters respectively associated with the managed computer systems $12_i$, for predetermined times (e.g., daily). The determined performance values each have a respective time-stamp associated therewith.

The analysis module 28 in an embodiment is associated with the master computer system $12_1$. The analysis module 28 is configured to analyze performance values, for a given change, to determine a before-versus-after format output 32 to thereby allow a user to determine the performance impact, if any, of the selected change. The analysis is based on the information contained in the condensed database $18_1$ as an input (i.e., the change records with time-stamps and the performance values also with time-stamps).

The user interface 30 generally allows the user to interact with the analysis module 28 to allow, among other things, the user to select a particular recorded change that has occurred in the one or more managed computer systems, in order to conduct a performance impact analysis.

Figure 2:
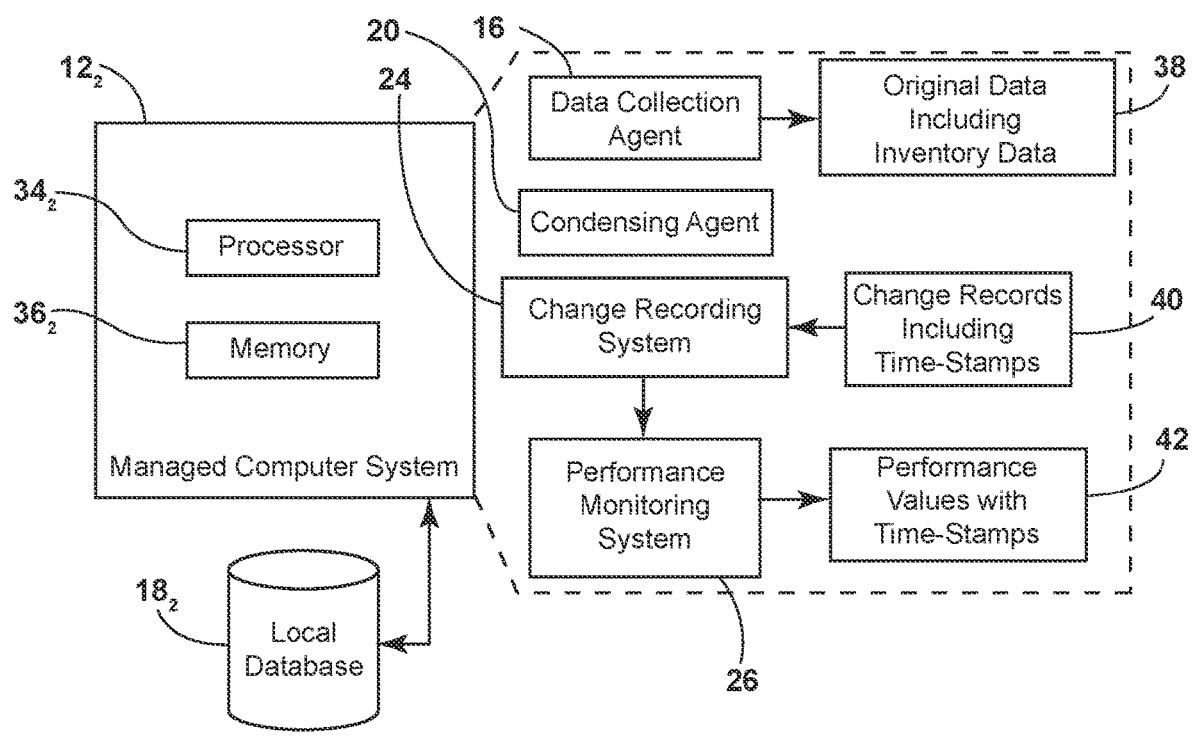
FIG. 2 is a diagrammatic and block diagram view showing, in greater detail, an embodiment of one of the managed computer systems of FIG. 1.

FIG. 2 is a diagrammatic and block diagram view showing, in greater detail, an exemplary managed computer system (e.g., managed computer system $12_2$) in which aspects of apparatus 10 may be implemented. In the illustrated embodiment, managed computer system $12_2$ includes an electronic processor $34_2$ and an associated memory $36_2$.

The processor $34_2$ may include processing capabilities as well as an input/output (I/O) interface through which processor $34_2$ may receive a plurality of input and generate a plurality of outputs. Memory $36_2$ is provided for storage of data and instructions or code (i.e., software) for processor $34_2$. Memory $36_2$ may include various forms of non-volatile (i.e., non-transitory) memory including flash memory or read only memory (ROM) including various forms of programmable read only memory (e.g., PROM, EPROM, EEPROM) and/or volatile memory including random access memory (RAM) including static random access memory (SRAM), dynamic random access memory (DRAM) and synchronous dynamic random access memory (SDRAM).

Memory $36_2$ stores executable code which when executed by the processor $34_2$ performs a number of functions as described herein on the managed computer system in the overall apparatus 10, including code to perform the functionality of the data collection agent 16 (as described herein), code to perform the functionality of the change recording system 24 (as described herein), and code to perform the functionality of the performance monitoring system 26 (as described herein). These and other functions described herein may together contribute to the overall performance of the method and apparatus for generating an output for facilitating assessment of the performance impact of a selected change in one or more managed computer systems (e.g., a before-change versus after-change display of a performance metric).

The managed computer systems $12_2, 12_3, 12_4, \ldots 12_n$ will also include an operating system (not illustrated) where the managed computer system may be a Windows-based computer, macOS-based computer, a Linux-based computer, a mobile phone, a kiosk, a special purpose handheld device such as barcode scanner, an Android-based computer, ChromeOS based computer, and IOS based devices, and/or other computing devices without limitation. The managed computer systems $12_2, 12_3, 12_4, \ldots 12_n$ may further include application programs suited in function and operation to the purpose(s) for which it has been developed and deployed.

The data collection agent 16 is configured to monitor and collect many types of information, including without limitation, performance data, configuration data, hardware and software inventory data, system health, connectivity including network connectivity, computing resource availability and usage, information about the relationships between various entities, as well as other information. This information is collectively designated at box 38. Most types of data collected by agent 16 are time-stamped when saving to allow time correlation analysis and for other purposes as described herein. It should be understood that the data collection agent 16 on each managed computer system $12_i$ gathers information that may be relevant for many different purposes. In an alternative embodiment, the local data store may be present on external storage or another computing system.

The data collection agent 16 may be configured to use various operating system application programming interfaces (APIs), access various existing collections of data of interest, and perform various direct observations of user, application, system activity, peripheral, hardware, software, and other aspects of operation. The data collection agent 16 may be configured to operate as a software service on the managed computer system, and may be configured to operate continuously. The data collection agent 16 may be further configured to directly record such captured data/observations (i.e., the original data 38) in the local data store (i.e., associated local database 18), and/or be configured to perform first-level analytics on the data to make decisions about what to save and/or perform various functions, such as mathematical transformations, on the observed/collected data (modified data).

The data collection agent 16 may also be configured (i) to operate as a system service directly on a managed computer system $12_i$; (ii) to operate substantially continuously; and (iii) to operate autonomously with respect to the master computer system and with respect to other managed (monitored) computer systems, which may have advantages for scale, mobility, cloud, and privacy. In an alternative embodiment, the data collection agent 16 may be configured to operate remotely from the managed (monitored) computer system itself.

In an embodiment, the data collection/analysis functionality that is performed by the data collection agent 16 may be implemented, at least in-part, by one or more components of a workspace analytics system, which may be a commercial product available under the trade designation SYSTRACK from Lakeside Software, LLC, Bloomfield Hills, Michigan USA, as mentioned above, and as described in the '012 application, the '189 application, and the '630 application mentioned above.

The condenser module (agent) 20 runs periodically on the managed computer system. The condenser module 20 is configured to take the original/inventory data/other data contained in the local database (e.g., database $18_2$) as an input and, in an embodiment, perform a variety of operations designed to reduce the volume of the data and/or create mathematically interesting analysis of that data. The condenser module 20 is further configured to send the condensed data to the condensed database $18_1$, which data may include the herein mentioned time-stamped change records and time-stamped performance values. The condenser module 20 is configured to run on the managed computer system $12_i$ at predetermined times (e.g., periodically) and/or at different time schedules for different types of data so as to provide flexibility to the implementation, and/or may be triggered to run upon demand by the master computer system $12_1$ and/or signaled by another external system. The condensed database $18_1$ contains data from many managed computer systems—such data being collectively sent to it via the respective condensers 20. The condensed database $18_1$ itself may exist partially on storage systems and partially in memory on the master system $12_1$.

Tracking changes across plural managed computer systems. As mentioned above, embodiments consistent with the instant disclosure include three main components, the first of which includes functionality configured to track changes to individual managed computer systems and to store or record such tracked/identified changes in the local data store $18_2$ (initially), and subsequently, to consolidate the recorded changes from the local data store $18_2$ to the condensed database $18_1$. The first tracking changes component may make use of, in part, the functionality of the data collection agent 16 described herein and as disclosed generally in the '630 application that runs on each system being monitored (i.e., the managed computer system) as well as the functionality of the change recording system 24, which is configured to store change records including time-stamps (see box 40 in FIG. 2) reflecting any changes made to the managed computer system $12_i$ in its local data store 18.

In an embodiment, the change recording system 24 is configured to process the original data 38 (including the inventory data) obtained by data collection agent 16 from its associated local database $18_i$ and determine whether any changes associated with the managed computer system $12_i$ have occurred (and when). For example, change recording system 24, as installed on the first managed computer system $12_2$, analyzes information about the first computer system $12_2$ as well as the original/inventory data 38 stored in the associated managed database $18_2$ and then determines whether any changes have occurred to the first managed computer system $12_2$. This general operation is performed on each of the managed computer systems $12_i$.

The change recording system 24 may detect changes by comparing the current gathered data with previously gathered information and determine differences to thereby detect changes, for example, as either an "upgrade", "add", "change" or a "delete" (e.g., of a hardware or software component). As additional example, the change recording system 24 can detect changed values and settings performed by a straightforward comparison of old and new data values. When the system 24 detects such changes, a change log (change records) may be created and/or maintained/updated in the local database $18_i$ such that it is possible to know what inventory item has changed, what an old setting/value was and what the new setting/value is and when (i.e., the time) this change occurred. In most cases, the time at which the change was detected is used as the time when the change occurred. The inventory data collected by data collection agent 16 may be evaluated either on a polling basis, where the time interval for when to conduct the check/comparison, is configurable (user configurable) or on an event-driven basis. In another embodiment, the change recording system 24 may be configured to detect changes in resource utilization patterns, health, performance, and other key indicators by using the same notion of comparing old and new values, and then updating the change log when necessary. The instant teachings allows for the leveraging of many types of change information.

Changes in utilization patterns can also be detected as changes herein. As an example of change detection, consider the removal of a connected USB device from the system (such as a mouse) and replacement with a different device. This may be detected as two changes, a device removal and a device addition. These would also be recorded in the change log.

The changes that can be monitored/recorded include but are not limited to the following types of changes:
 (1) Adding, removing or updating software packages;
 (2) Installing operating system patches;
 (3) Adding or removing hardware;
 (4) Installing or updating hardware device drivers;
 (5) Changing device configuration settings;
 (6) Changing security policies or user profiles; and
 (7) Adding or removing browser add-ins.

The change recording system 24, including any support functionality of the data collection agent 16, records (i) the details of each change as it happens (or as nearly as can be determined) on the managed computer system, along with (ii) a respective time stamp indicating when the change occurred (or was determined to have occurred). This change data (i.e., FIG. 2—change records 40 including time-stamps) is stored on the managed computer system (e.g., on an edge device), in the local database store 18 associated therewith. In an embodiment, at predetermined times, such as once per day, each managed computer system being monitored is configured to send a filtered list of the changes recorded (i.e., change records 40) for that day to the condensed database $18_1$ (master repository) associated with the master computer system $12_1$.

As noted above, the list of changes may be filtered so as to exclude changes that would be specific (i.e., unique) to that managed computer system, or unlikely to be useful in finding performance issues among a larger or alternatively an entire population of managed computer systems. The filtering may happen at a configuration level, which can be assigned to one or more managed computer systems, and in this regard, there can be a default list of changes that are designated to be ignored (i.e., filtered and therefore not sent) that all the configurations inherit by default. Alternatively, this default list can be modified on a per configuration basis. Some examples of changes that are ignored by default may include but are not limited to: the last password change date, battery-related measurements, and a last write time for a user profile.

With continued reference to FIG. 2, each change record 40 sent to the condensed database $18_1$ may include at least the following:
 (1) System id (identification);
 (2) Change time;
 (3) Change type—Add, Remove (sometimes described as Delete), Update (sometimes described as Change), Upgrade;
 (4) Change class—including but not limited to—Software, Operating System Patch, Group Policy, Monitor, Disk Drive, Network Interface, Add Ins, Accounts, System Drivers, etc.;
 (5) Change description; and
 (6) For Upgrade type, the previous version and new version if available.

Tracking daily performance across managed computer systems. The second main component involves monitoring/tracking and aggregating performance measurements (i.e., values) across the managed computer systems at predetermined times, such as on a daily basis. In this regard, the performance monitoring system 26 is provided and is configured to output performance values (measurements) 42 including associated time-stamps, as explained below. This functionality may be implemented in part by the base functionality of the workspace analytics system referred to herein and in the incorporated by reference patent applications, namely, the '012 application, the '189 application, and the '630 application, but as extended in functionality as described herein. The performance monitoring system 26 is configured to constantly monitor the managed computer system's performance and in an embodiment, may make use of, in part, the functionality of the data collection agent 16 and/or condensing agent 20, as seen by reference to the '630 application. Performance data may be, and in an embodiment is, collected and stored at predetermined time intervals, such as every 15 seconds by the data collection agent 16 in a local data store 18 on the managed computer system (for example only—on an edge computer system).

In an embodiment, the performance monitoring system 26 is configured to produce a daily performance view, which aggregates this detailed performance data into a daily summary and consolidates it to the condensed database $18_1$ (master repository) as described above with respect to the change records 40. For example, this process may calculate the number of minutes during the day that a user was actively using the managed computer system and in an embodiment, may determine over fifty (50) separate performance metrics, aggregated by day. Performance values for these performance metrics may include but are not limited to the following:

(1) Average, maximum and standard deviation of CPU usage while active;
(2) Average processor queue length;
(3) Average, maximum, minimum and standard deviation of memory usage while active;
(4) Average, maximum and standard deviation of network usage in both bytes and percentage;
(5) Average input/output (I/O) reads and writes, as well as I/O rates;
(6) Average disk utilization and disk queue length;
(7) Average CPU usage in user vs. kernel mode;
(8) Average application load times;

In an embodiment, each day this daily performance data is consolidated from individual managed computer systems in combination with data in the local database 18 to the condensed database $18_1$, where it can be joined with the change data described above.

Figure 3:
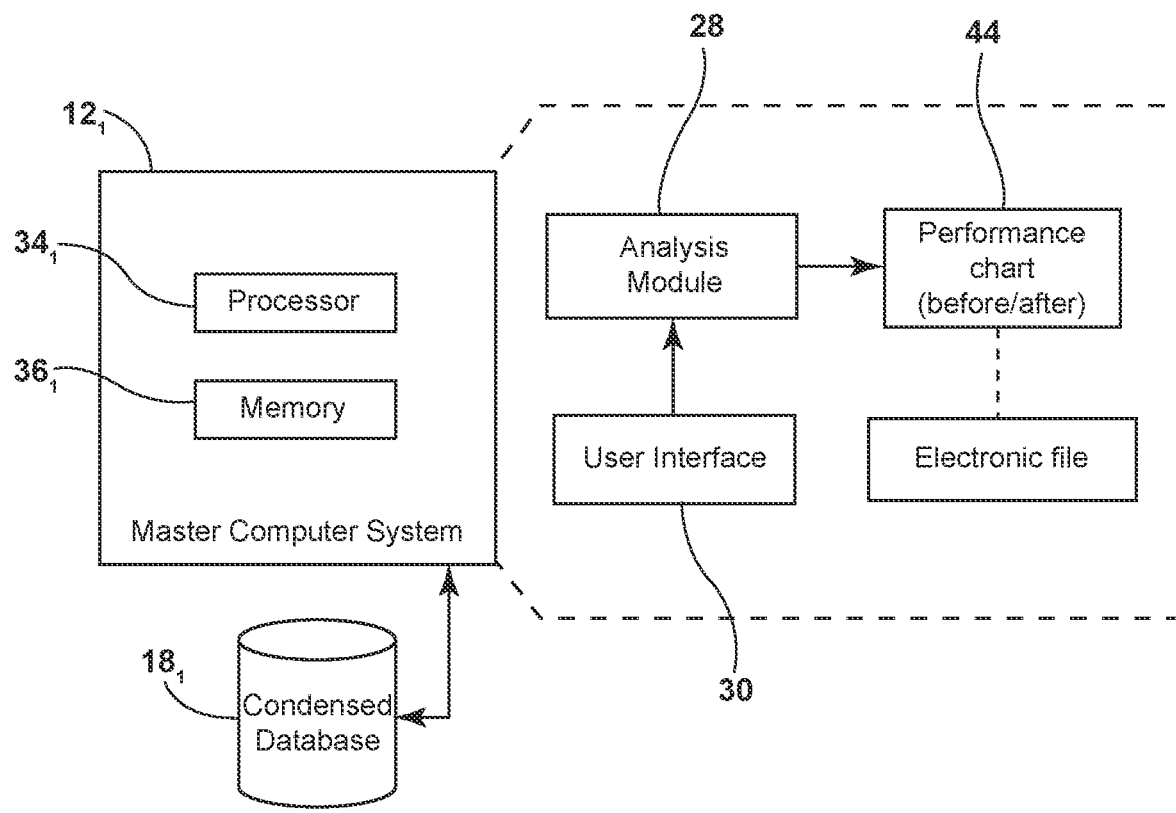
FIG. 3 is a diagrammatic and block diagram view showing, in greater detail, an embodiment of the master computer system of FIG. 1.

FIG. 3 is a simplified diagrammatic and block diagram view of the master computer system $12_1$ on which aspects of the overall apparatus 10 may be implemented. In the illustrated embodiment, the master computer system $12_1$ includes an electronic processor $34_1$ and an associated memory $36_1$. The processor $34_1$ may include processing capabilities as well as an input/output (I/O) interface through which processor $34_1$ may receive a plurality of input and generate a plurality of outputs. Memory $36_1$ is provided for storage of data and instructions or code (i.e., software) for processor $34_1$. Memory $36_1$ may include various forms of non-volatile (i.e., non-transitory) memory including flash memory or read only memory (ROM) including various forms of programmable read only memory (e.g., PROM, EPROM, EEPROM) and/or volatile memory including random access memory (RAM) including static random access memory (SRAM), dynamic random access memory (DRAM) and synchronous dynamic random access memory (SDRAM).

In an embodiment, memory $36_1$ stores executable code which when executed by the processor $34_1$ performs a number of functions as described herein in the master computer system $12_1$ as part of the overall apparatus 10, for example, code to perform the functionality of the analysis module 28 as described herein and code to perform the functionality of the user interface 30 as described herein and produce the described output(s) 32. The master computer system $12_1$ has associated with therewith, additionally, software that receives condensed data (i.e., change records 40 and performance records 42) and that operate on such data and further stores it in the condensed database $18_1$. The condensed database $18_1$ contains data from many managed computer systems $12_i$—such data being collectively sent to it via the respective condensers 20. The condensed database $18_1$ itself may exist partially on storage systems and partially in memory on the master computer system $12_1$.

The master computer system $12_1$ will include (1) an operating system (not illustrated) where the master computer system may be a Windows-based computer, macOS-based computer, a Linux-based computer, Android, ChromeOS, or IOS based devices for example only without limitation and (2) may include application program(s) suited in function and operation to the purpose(s) of the user(s) of the master computer system $12_1$. The master computer system $12_1$ may be embodied in a per-system-collection "on premises" solution, or may be embodied in a cloud-delivered solution. In a constructed embodiment, the master computer system comprises a Windows-based computer.

The user interface 30 is configured to allow the user to interact with the analysis module 28 to obtain a user's selection and generate an output as will be described below, such as a before-versus-after chart 44 (e.g., on a display) or alternatively as an electronic file. The analysis module 28 is associated with the master computer system $12_1$.

The condensed database $18_1$ (master repository) is configured to maintain the consolidated change data (i.e., change records 40) from the managed computer systems that have reported such data for a programmable (predetermined) number of days (a "retention period"), which may typically be around thirty (30) days. It should be understood that the block diagram format for FIG. 3 is exemplary and for purposes of description. One of ordinary skill in the art will understood that variations are possible and that in constructed embodiments, functionality may be consolidated. For example, the user interface 30 and the before/after chart 44 may present as a single UI box that includes the chart and the functionality to interact with the user—with two way communication with the analysis module 28. Additionally, in constructed embodiments, code may be transmitted from the master computer system to a client computer system separate from the master computer system where such code is executed in a browser, for example only.

Figure 4:
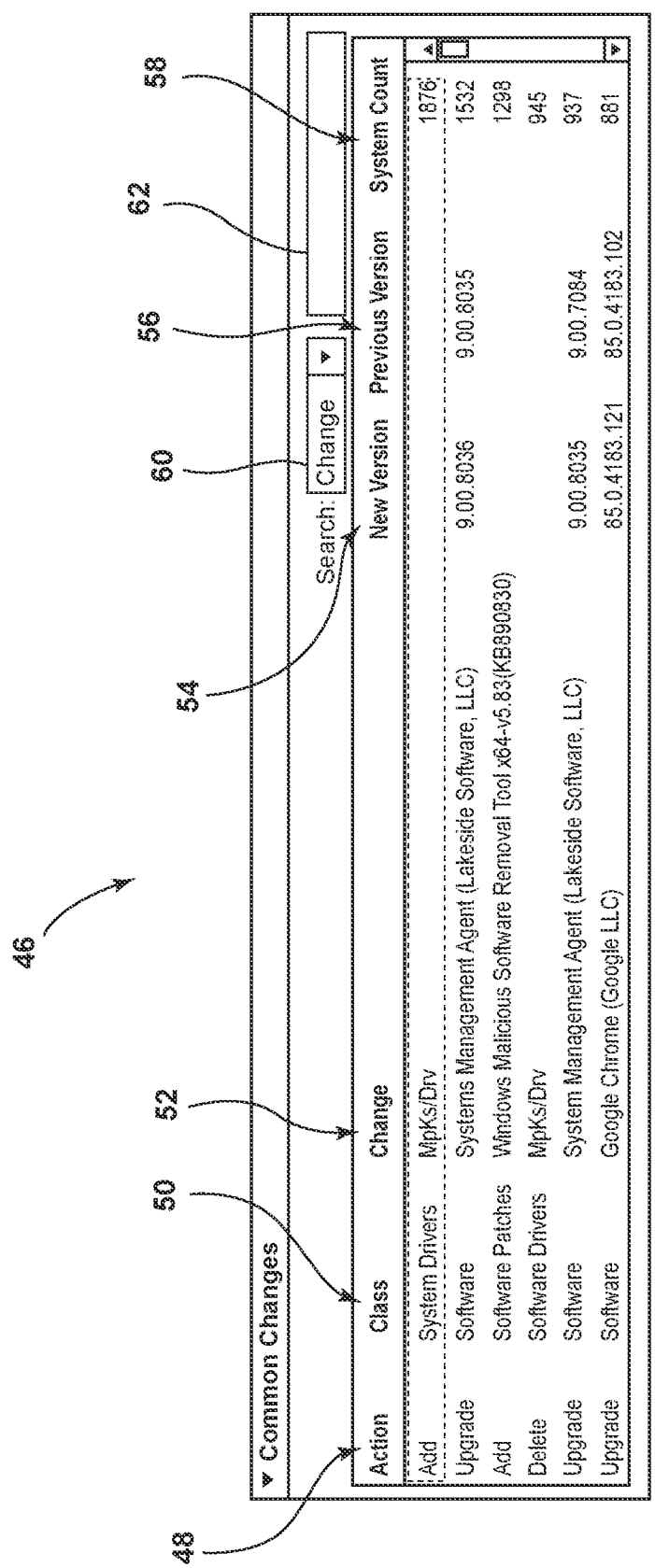
FIG. 4 is a simplified screenshot of a user interface in the master computer system and configured to present the consolidated changes of the managed computer systems, including change selection functionality for performance impact assessment, in an embodiment.

FIG. 4 is a simplified screenshot view of a table 46 produced via user interface 30 that includes consolidated change data in tabular form, which includes a first column 48 ("Action"), which corresponds to the above-described Change type, a second column 50 ("Class"), which corresponds to the above-described Change class, a third column 52 ("Change"), which corresponds to the above-described Change id and Change description, fourth and fifth columns 54, 56 ("New Version" and "Previous Version"), which indicates the new version and previous version of the changed item, and a sixth column 58 ("System Count"), which corresponds to the total number of managed computer systems that have had the specified change made thereto. The table 46 further includes search functionality as shown by the drop down menu 60 and input text box 62. This consolidated change data, a portion of which is displayed in table 46, can then be further processed (e.g., by the analysis module 28) such that consolidated change data can be grouped by change type ("Action" column 48), change class ("Class" column 50) and change description ("Change" column 52) to give an overall count of the number of managed computer systems $12_i$ that had a given change at any point during the above-mentioned retention period (e.g., "System Count" column 58). The analysis module 28 is further configured to be able to determine and output as a further view to a user on which day any individual managed computer system had a specific change applied, for example only.

The functionality of tracking, consolidation, and processing of the change data associated with the managed computer system(s) (by the analysis module 28) may therefore be distributed in the sense that the data collection and first-level processing occurs at the managed computer system level while further processing in regard to the changes of the population of managed computer systems may occur at the master computer system level.

Figure 5:
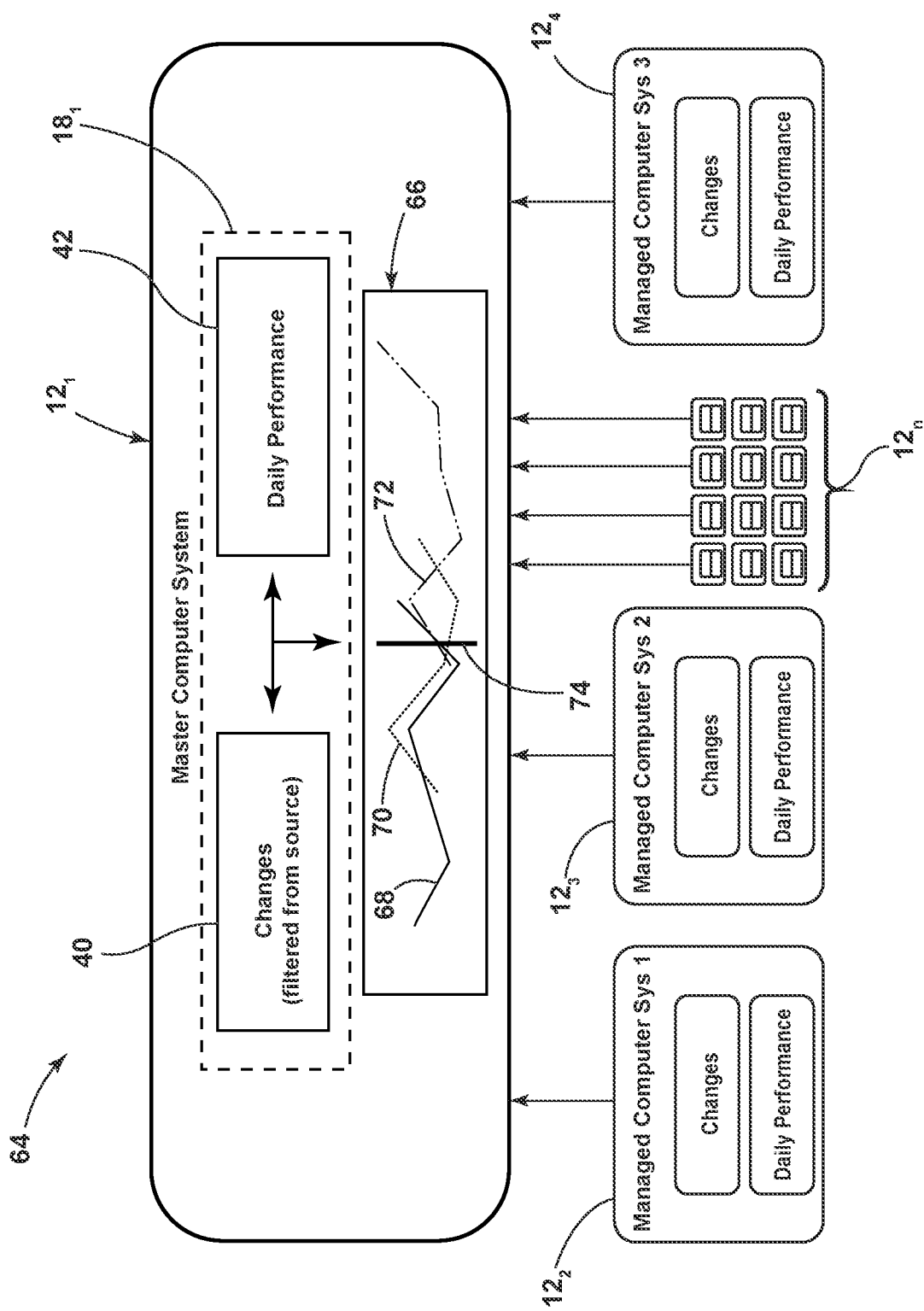
FIG. 5 is a simplified block diagram showing, in block form, the overall apparatus from a data flow perspective including changes and daily performance data originating in the managed computer systems flowing to the master computer system, in an embodiment.

FIG. 5 is a simplified block diagram designated 64, illustrating the overall apparatus 10 from a data flow perspective, for generating an output for facilitating the assessment of the performance impact of a selected change in a managed computer system (or systems). As shown, each managed computer system $12_2, 12_3, 12_4, \ldots 12_n$ collects and stores both change data and performance data (daily). The change and performance data is then transmitted by each managed computer system $12_2, 12_3, 12_4, \ldots 12_n$ to the master computer system $12_1$, where it is consolidated to the condensed database $18_1$ and where it may be joined together with data from all other managed computer systems. The analysis module 28 is configured to generate an output designated 66 (corresponding to output 32 in FIG. 1 and output 44 in FIG. 3). The output 66 constitutes a detailed performance impact report for each selected change. The output 66 also comprises an exemplary before-change versus after-change chart for a selected change, which displays in exemplary fashion the changes in a performance metric for three managed computers having lines 68, 70, and 72 associated therewith all plotted on a common timeline. The change time-stamp associated with the selected change acts as a reference time 74 (i.e., for distinguishing before-change versus after-change, and hereafter may be referred to as the "Day 0" reference time).

Calculating the performance impact for a selected change. The user interface 30 is configured to present to the user a display and mechanism to allow the user to select a change to investigate from a list of all recorded changes, for example, as shown in FIG. 4. After the user selects a particular change for analysis, the analysis module 28 is configured to generate an output comprising various before-versus-after charts/graphs rendered in various ways, as described in greater detail herein, that allows the user to evaluate the impact, if any, of the selected change on one or more performance metrics/indicators. It should be understood that the output generated by the analysis module 28 may comprise, in an embodiment, data that is used by the user interface to construct the herein mentioned before versus after tables and/or charts.

In an embodiment, the analysis module 28 is configured to process the daily performance data for the managed computer systems that have the selected change so as to time-shift the performance data so that the day of the selected change is deemed to be or is considered as Day 0. The day after the selected change on each managed computer system—which could be a different calendar day for any given managed computer system—is considered Day 1, the second day after the selected change is Day 2 and so on. The first day before the selected change is considered Day −1, the day before that is considered Day −2, and so on. By doing this alignment procedure, the analysis module 28 can calculate aggregate performance metrics across multiple managed computer systems that have the selected change occurring on disparate days.

FIGS. 6A-6D are timing diagrams illustrating how performance values from two different managed computer systems can be aligned according to the alignment procedure mentioned above so as to allow the analysis module 28 to calculate aggregate performance metrics as also mentioned above.

Figure 6A:
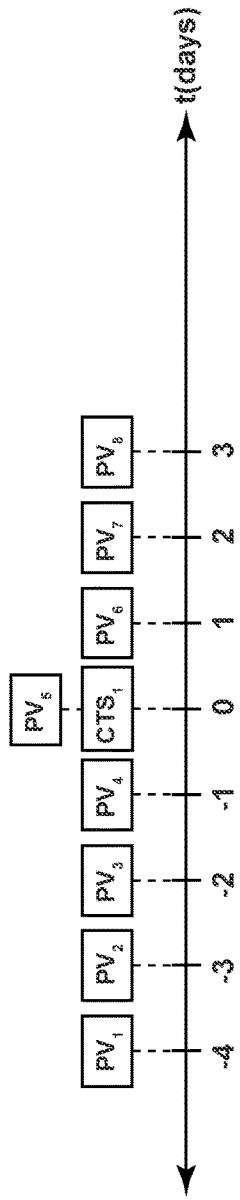
FIGS. 6A-6D are simplified timing diagrams showing performance values of a second managed computer being aligned with the performance values of a first managed computer system, in an embodiment.

FIG. 6A shows performance data for a first managed computer system having a selected change occurring at particular time, such time being indicated by a first change time-stamp $CTS_1$. In FIG. 6A, the time of the selected change for the first managed computer system will be deemed "Day 0" as illustrated. FIG. 6A further shows eight performance values designated $PV_1, PV_2, PV_3, PV_4, PV_5, PV_6, PV_7,$ and $PV_8$ which are associated with a given performance metric associated with the first managed computer system. These eight performance values $PV_1, PV_2, PV_3, PV_4, PV_5, PV_6, PV_7,$ and $PV_8$ are respectively associated with Day −4, Day −3, Day −2, Day −1, Day 0, Day 1, Day 2, and Day 3—all timing being relative to the Day 0 reference time—the time that the selected change occurred on the first managed computer system.

Figure 6B:
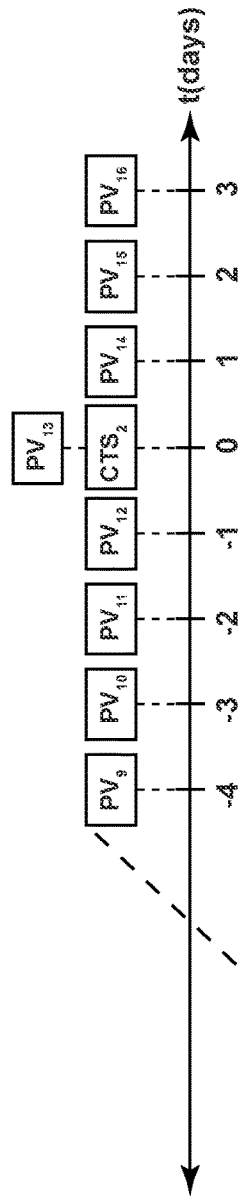

FIG. 6B similarly shows performance data for a second, different managed computer system having the same selected change as the first managed computer system but occurring at different time indicated by a second change time-stamp $CTS_2$. In FIG. 6B, the time of the selected change for the second managed computer system will be deemed to be "Day 0" as illustrated. While this second change time-stamp $CTS_2$ may act as the reference time ("Day 0") for considering before-versus-after performance impact analysis for that second managed computer system, the difference in time with respect to when the selected change occurred on the two different managed computer systems makes direct aggregation of the performance values for a multi-system before-versus-after analysis not directly available. FIG. 6B shows that the second managed computer system also has eight performance values designated $PV_9, PV_{10}, PV_{11}, PV_{12}, PV_{13}, PV_{14}, PV_{15},$ and $PV_{16}$ which are associated with the given performance metric. These eight performance values $PV_9, PV_{10}, PV_{11}, PV_{12}, PV_{13}, PV_{14}, PV_{15},$ and $PV_{16}$ are respectively associated with Day −4, Day −3, Day −2, Day −1, Day 0, Day 1, Day 2, and Day 3—all timing being relative to the Day 0—the day the selected change occurred on the second managed computer system.

Figure 6C:
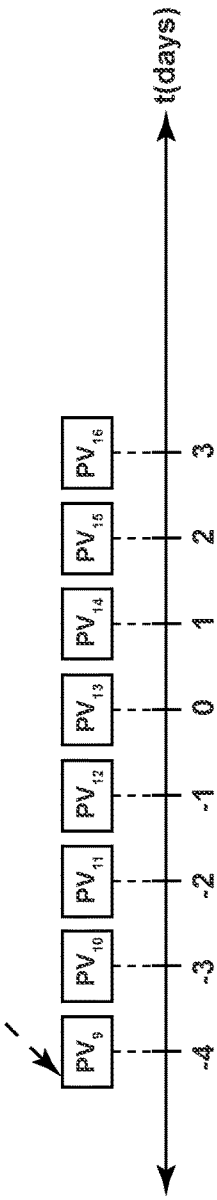

FIG. 6C shows the result of the alignment process described above where a difference in time is determined based on the respective change time-stamps $CTS_1$ and $CTS_2$—here it is three days. Once this difference is determined, the performance values, for example of the second managed computer, are time-shifted and aligned using the determined difference in change time-stamps. After the shifting/alignment has been done, the performance values of the first managed computer system (FIG. 6A) and the aligned performance values of the second managed computer system (FIG. 6C) can be directly processed and compared from a timing perspective for a true before-versus-after aggregation, since the "Day 0" time for the two different systems has now been aligned.

Figure 6D:
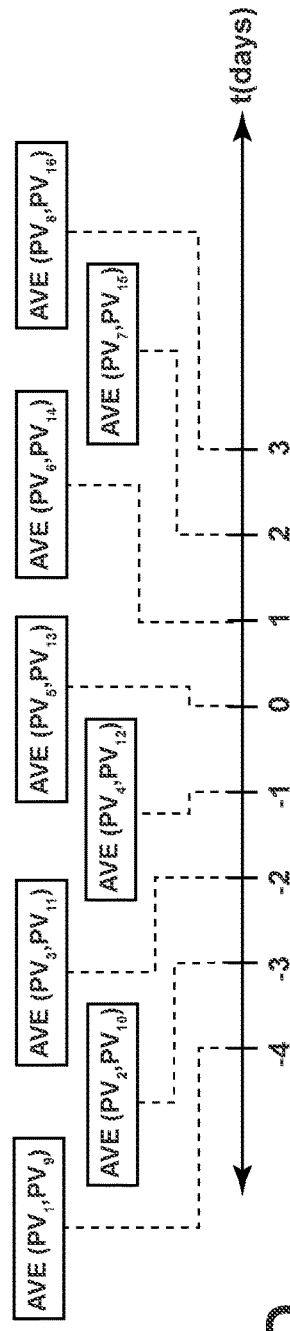

FIG. 6D is a timing diagram that shows in exemplary fashion a composite performance value for the first and second managed computer systems. For example, for Day −4, the composite value can be the arithmetic average of the two values AVERAGE(PV$_1$, PV$_9$), the composite value for Day −3 can be the arithmetic average of the two values AVERAGE(PV$_2$, PV$_{10}$), and so on. The performance impact of a selected change occurring at disparate times across multiple managed computer systems can now be aggregated for an accurate multi-system before-change versus after-change assessment. In an embodiment, the performance value at Day 0 will be a composite value (e.g., such as an average value) on the before versus after chart and moreover, the Day 0 values will be included in both the before and the after overall averages in the grid.

The analysis module 28 may be configured, in an embodiment, to only consider daily performance records for managed computer systems that had at least one active user session during the day. For example, if the managed computer system is unused on a particular day, the analysis module 28 may be configured to ignore the performance record for that day.

The analysis module 28 may be further configured, in an embodiment, to calculate the average for every metric across every managed computer system for a programmable (i.e., predetermined) number of days. Typically, and in one embodiment, the predetermined number of days would be from Day −6 to Day 6. The analysis module 28 is further configured to calculate, in an embodiment, a "before" average for each metric on Days −N through Day 0, and an "after" average for each metric on Days 0 through Day +N. This allows a high-level comparison of overall managed computer system performance before versus after the selected change (see FIGS. 7A-7B below).

FIGS. 7A-7B show exemplary displays 76, 76' illustrating an overall "Before Change" and an "After Change" presentation generated by the analysis module 28 for a plurality of performance metrics, given a selected change occurring on the managed computer systems. Displays 76, 76' are rendered in a tabular format where the before-change data is distinguishable from the after-change data. In particular, displays 76, 76' include a "Before Change" row 78 and an "After Change" row 80, where individual columns represent individual performance metrics, such as without limitation column 82 corresponding to an "Active CPU Average" performance metric, column 84 corresponding to an "Active Memory Average" performance metric, column 86 corresponding to an "Active I/O Read Bytes" performance metric, and column 88 corresponding to an "Active I/O Written Bytes" performance metric.

In displays 76, 76', the "before change" data in row 78 is distinguishable from the "after change" data in row 80 by virtue of at least the separate organization and presentation/arrangement. In embodiments, the "after change" performance data in row 80 can be further distinguished by color or other visually distinguishable means into a first group and a second group. The first group—as represented in display 76 in exemplary fashion in columns 86, 88 as cells being rendered in the color green—may correspond to performance metric(s) that are not adversely affected by the selected change. The second group—as represented in exemplary fashion in columns 82, 84 as cells being rendered in the color red—may correspond to performance metric(s) that are deemed to have been adversely affected by the selected change. Note that in display 76, the entire cell is rendered in the desired color while in display 76', alternatively, a green color icon (circle shape) or a red color icon (square shape) is present within the cell, which may additionally feature a color line border around the perimeter of the cell (e.g., a red color line border for a cell having a red color square icon or a green color line border for a cell having a green color circle icon). Variations are possible. In an embodiment, each performance metric has a property associated therewith that indicates whether a higher value or a lower value is better. Each performance metric further also has a threshold value, such that if the after-change value is more than the threshold (e.g., 10% but can be configurable) in either direction from the before-change value, the cell is rendered in a green color or a red color, depending on whether the direction the value changed is in a better or worse direction.

In addition, for each individual performance metric, the analysis module 28 via the user interface 30 is configured to allow the user to select and thereby investigate a daily trend over a covered period (see, e.g., FIG. 8).

FIG. 8 is an exemplary display illustrating a chart 90 of such a daily trend of a particular performance metric ("Average Network Usage") across and for the plurality of managed computer systems having a particular, same change. Each daily performance value in chart 90 is the average of the plurality of performance values of the managed computer systems, for each of the days shown before and after the time when the selected change occurred on the managed computer systems. In particular, chart 90 shows a first line segment 92 corresponding to a "before-change" category of performance values for Days −6, −5, −4, −3, −2, and −1, which line segment continues to a Day 0 value. Chart 90 also shows a second line segment 94 corresponding to an "after-change" category of performance values starting from the Day 0 time and extending through times at Day 1, 2, 3, 4, 5, and terminating at the time of Day 6. The first line segment 92 may be distinguishable from the second line segment 94, by virtue of line type, line thickness, color, symbols arranged thereon, or in other ways now known or hereafter developed.

In an embodiment, the displays of FIG. 4 (change data), FIG. 7A or 7B (performance metrics), and FIG. 8 (day-by-day graph) may all appear on the same screen display simultaneously. The change is first selected (FIG. 4) and as a consequence the summary for all the performance metrics (FIG. 7A or 7B) will also be displayed. One performance metric can (and will) be chosen to show the day-by-day (before-change versus after-change) chart, like in FIG. 8. It should be understood that variations are possible.

In another embodiment, as an example, the chart in FIG. 8 could be generated as an output from analysis module 28 from the change and performance data for four individual managed computer systems, as shown in FIG. 9.

FIG. 9 is an exemplary display illustrating a chart 96 relating to four managed computer systems. As can be seen in FIG. 9, not every managed computer system will have data for every day before and after a selected change. A managed computer system may be off because of work patterns, or a user may not have actively used such managed computer system on a given day for any number of reasons. By time shifting and sanitizing missing data, the analysis module 28 will be able to give an accurate view of the true performance impact of a selected change across a plurality of managed computer systems (e.g., for an organization). In this regard, the term sanitizing means ignoring data for those days when a managed computer system is not being used—as opposed to treating the subject performance value as a zero value and thereby skewing the calculated averages. The daily average utilizes the number of systems actually in use each day, rather than the total number of managed computer systems with the selected change.

In an embodiment, the scope or range of possible changes and/or performance metrics to be monitored may be made, as an initial matter, by a system designer when an embodiment is constructed. However, it should be understood that indirectly, embodiments consistent with the instant disclosure do allow for the dynamic addition of inventory data, which then falls into change management, and also the dynamic addition of performance metrics. In an alternate embodiment, a user interface may be provided to allow a user to control the selection of changes, performance metrics, or both. In an embodiment, the apparatus according to the instant disclosure may be configured to make such change/performance metrics based on other factors.

Figure 10:
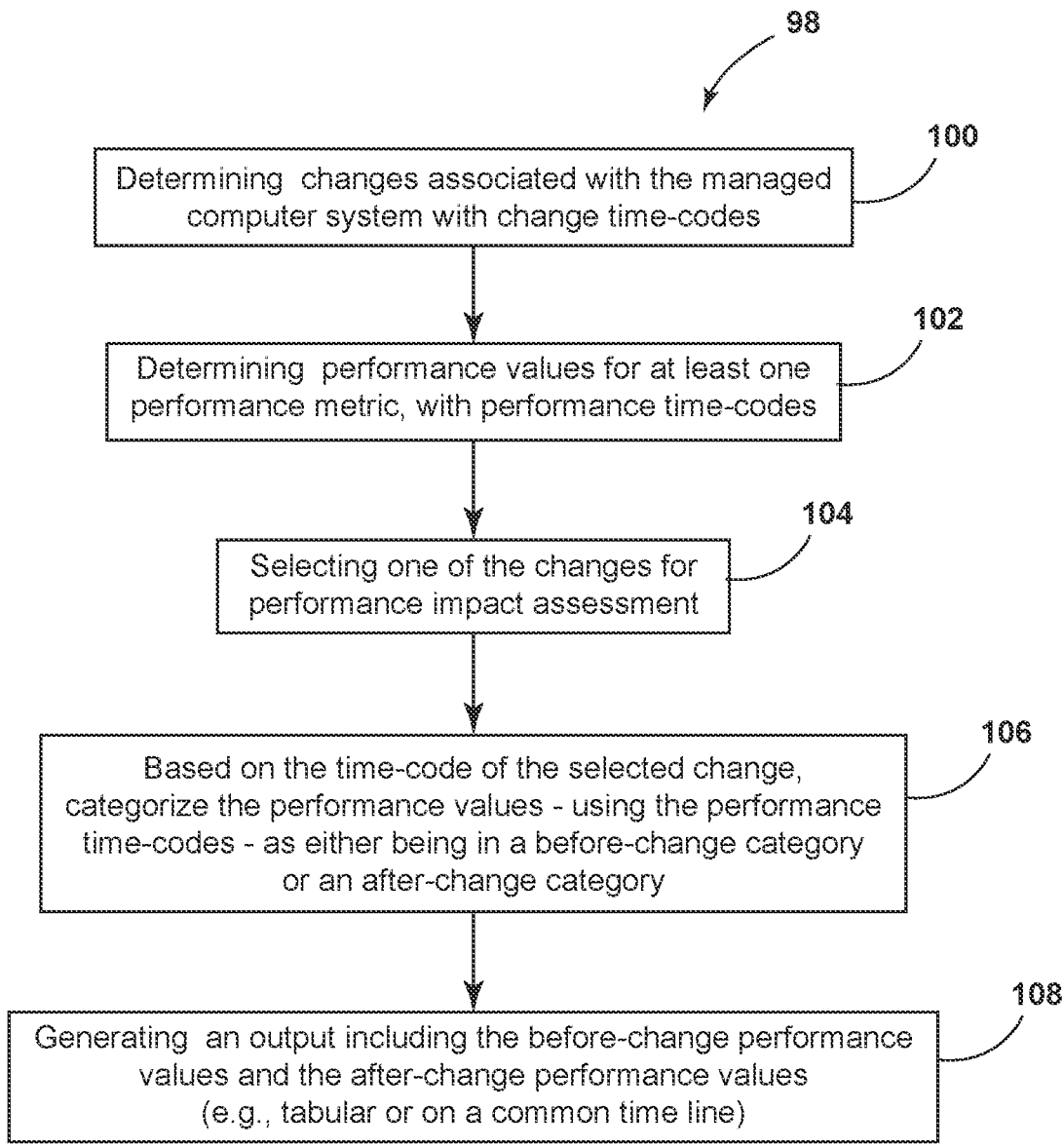
FIG. 10 is a simplified flowchart showing a method of generating an output suitable to facilitate determining a performance impact due to a change on a managed computer system, in an embodiment.

FIG. 10 is a simplified flowchart diagram showing a method 98 in accordance with an embodiment, for generating an output for facilitating the assessment of the performance impact of a selected change in one or more managed computer systems. The method begins in step 100.

In step 100, the method involves determining changes associated with a first managed computer system of the one or more managed computer systems and storing, in a first data store, change records corresponding to the determined changes. Each of the change records includes a respective change time-stamp indicating when each change was determined. The method proceeds to step 102.

In step 102, the method involves determining a plurality of performance values for at least one performance metric associated with the first managed computer system for predetermined times (e.g., daily). The method further involves associating with each of the performance values a respective performance time-stamp. It should be understood that in embodiments, steps 100, 102 may occur substantially continuous and in parallel. In addition, in embodiments, such change records and performance data may be consolidated to the condensed database, as described herein, and in particular, for embodiments involving a plurality of managed computer systems, such consolidated data represents the changes in the plurality of managed computer systems. The method proceeds to step 104.

In step 104, the method involves selecting one of the changes that occurred on the first managed computer system for performance impact assessment. The selected one of the changes has an associated selected change time-stamp. The method proceeds to step 106.

In step 106, the method involves identifying first performance values from the plurality of performance values that have performance time-stamps that are prior in time to the time-stamp of the selected change. The first performance values thereby identified are associated with a before-change category of performance values. The method also involves identifying second performance values from the plurality of performance values that have performance time-stamps that are later in time relative to the time-stamp of the selected change. The second performance values thereby identified are associated with an after-change category of performance values. The method proceeds to step 108.

In step 108, the method involves generating an output that includes the first and second performance values. In the generated output, the first performance values associated with the before-change category are distinguished from the second performance values associated with the after-change category. In an embodiment, the first and second performance values may be arranged in a tabular format or on a common timeline format, for example only, to thereby allow the user to determine the performance impact, if any, of the selected change using such output. It should be understood that the foregoing method can be applied to a plurality of managed computer systems where the output comprises a multi-system output reflecting the performance impact across the plurality of managed computers systems, even where the same change occurred at disparate times, all as described herein.

In sum, embodiments consistent with the instant disclosure generally facilitate determining the performance impact of a selected change in one or more managed computer systems, and include three main components: (i) a first component that is configured to track changes to individual managed computer systems and consolidate the resulting change data into a single, centralized master repository—this first component involving functionality at the managed computer system level in addition to functionality at a master computer system level; (ii) a second component that is configured to aggregate performance measurements (values), for example daily, across the plurality of managed computer systems and to consolidate the respective performance data into the master repository—this second component also involving functionality at the managed computer system level in addition to functionality at the master computer system level; and (iii) a third component that is configured to analyze the foregoing change and performance data and generate an output (e.g., before-change versus after-change) to allow a user to determine the performance impact, if any, for the user-selected change that occurred to one or more of the managed computer systems.

It should be understood that a processor as described herein may include conventional processing apparatus known in the art, capable of executing pre-programmed instructions stored in an associated memory, all performing in accordance with the functionality described herein. To the extent that the methods described herein are embodied in software, the resulting software can be stored in an associated memory and can also constitute the means for performing such methods. Implementation of certain embodiments, where done so in software, would require no more than routine application of programming skills by one of ordinary skill in the art, in view of the foregoing enabling description. Such a processor may further be of the type having both ROM, RAM, a combination of non-volatile and volatile (modifiable) memory so that any software may be stored and yet allow storage and processing of dynamically produced data and/or signals.

It should be further understood that an article of manufacture in accordance with this disclosure includes a computer-readable storage medium having a computer program encoded thereon for implementing the logic for determining the performance impact of changes in a computing system and other functionality described herein. The computer program includes code to perform one or more of the methods disclosed herein. Such embodiments may be configured to execute on one or more processors, multiple processors that are integrated into a single system or are distributed over and connected together through a communications network, and where the network may be wired or wireless.

The terms "electrically connected" and "in communication" are meant to be construed broadly to encompass both wired and wireless connections and communications. It is intended that all matter contained in the above description or shown in the accompanying drawings shall be interpreted as illustrative only and not limiting. Changes in detail or structure may be made without departing from the invention as defined in the appended claims.

Any patent, publication, or other disclosure material, in whole or in part, that is said to be incorporated by reference herein is incorporated herein only to the extent that the incorporated materials do not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material. While one or more particular embodiments have been shown and described, it will be understood by those of skill in the art that various changes and modifications can be made without departing from the spirit and scope of the present teachings.

What is claimed is:

1. A method for generating an output for facilitating assessment of a performance impact of a change in one or more managed computer systems, comprising:
   determining changes associated with at least a first managed computer system of the one or more managed computer systems and storing, in a first data store, change records corresponding to the determined changes wherein each of the change records includes a respective change time-stamp indicating when each change was determined;
   determining a plurality of performance values for at least one performance metric associated with the first managed computer system for predetermined times and associating with each of the performance values a respective performance time-stamp;
   selecting one of the changes to the first managed computer system for change impact assessment, wherein the selected change has an associated change time-stamp, wherein selecting one of the changes to the first managed computer system for change impact assessment comprises: providing a user interface wherein a plurality of candidate changes are presented for selection by a user; receiving by way of the user interface an input from the user identifying one of the candidate changes to define the selected change;
   identifying first performance values from the plurality of performance values that have performance time-stamps that are prior in time to the time-stamp of the selected change and associating the first performance values with a before-change category;
   identifying second performance values from the plurality of performance values that have performance time-stamps that are later in time relative to the time-stamp of the selected change and associating the second performance values with an after-change category; and
   generating an output comprising the first and second performance values wherein the first performance values associated with the before-change category are distinguished from the second performance values associated with the after-change category, to thereby allow a user to determine the performance impact of the selected change using the output.

2. The method of claim 1 wherein generating the output further comprises producing an output type from one of a tabular format and a common timeline format.

3. The method of claim 2 wherein the output type comprises the common timeline format, and wherein the outputting comprises:
   plotting the first performance values associated with the before-change category as a first line segment with respect to the common timeline;
   plotting the second performance values associated with the after-change category as a second line segment with respect to the common timeline, wherein the second line segment is visually distinguishable from the first line segment.

4. The method of claim 3 further comprising:
   selecting display criteria for the first and second line segments so as to be distinguishable by virtue of at least one of a color, a line type, a line thickness, and an inclusion of one or more symbols within at least one of the first and second line segments.

5. The method of claim 1 wherein the outputting further comprises designating a time corresponding to the time-stamp of the selected change to the first managed computer system as a reference time for distinguishing the first performance values associated with the before-change category and the second performance values associated with the after-change category.

6. The method claim 5 wherein the outputting further comprises one of displaying the first and second performance values and generating an electronic file.

7. The method of claim 1 further comprising associating with each candidate change:
   (i) a respective change type that is selected from the group comprising a first type corresponding to an add kind of change in the first managed computer system, a second type corresponding to a deletion kind of change in the first managed computer system, and a third type corresponding to a modification kind of change in the first managed computer system,
   (ii) a respective change class selected from the group comprising software, operating system patch, group policy, monitor, disk drive, network interface, add-ins, accounts, and system drivers, and
   (iii) a respective change description.

8. The method of claim 7 wherein providing the user interface further comprises displaying the plurality of candidate changes in a tabular format and grouped by at least one of change type, change class, and change description.

9. The method of claim 1 wherein the changes comprise first changes, the selected change comprises the selected first change wherein the selected first change has associated therewith a first change time-stamp, the one or more managed computer systems further comprising a second managed computer system, the method further comprising:
   determining second changes associated with the second managed computer system and storing, in a second data store, second change records corresponding to the determined second changes, wherein each of the second change records includes a respective change time-stamp indicating when each of the second changes was determined;
   determining a plurality of performance values for the at least one performance metric associated with the second managed computer system for predetermined times and associating with the performance values a respective performance time-stamp;
   selecting one of the second changes to the second managed computer for change impact assessment wherein the selected one of the second changes is the same as the selected one of the first changes, the selected one of the second changes having a second change time-stamp associated therewith.

10. The method of claim 1 further comprising
    collecting original data including inventory data associated with components and operation of the first managed computer system, wherein the components comprises at least one of hardware components, firmware components, operating system software, hardware device driver components, operating system kernel components, software packages and applications, device configuration settings and operating data, security policies, user profiles, and web browser add-ins, and determining the changes using the collected original data.

11. The method of claim 10 wherein determining changes comprises evaluating a subset of the collected original data corresponding to the inventory data and then outputting the change records that identify the changes that occurred and respective time-stamps indicating when each such change was determined.

12. The method of claim 10 wherein determining the changes comprises ascertaining one of an addition of a component, a change of a component, and a deletion of a component.

13. The method of claim 10 wherein determining the changes comprises ascertaining one of an addition of a new software package, a update of an existing software package, and a removal of the existing software package.

14. A method for generating an output for facilitating assessment of a performance impact of a change in one or more managed computer systems, comprising:

determining first changes associated with at least a first managed computer system of the one or more managed computer systems and storing, in a first data store, first change records corresponding to the determined first changes wherein each of the first change records includes a respective first change time-stamp indicating when each change was determined;

determining a plurality of performance values for at least one performance metric associated with the first managed computer system for predetermined times and associating with each of the performance values a respective performance time-stamp;

selecting one of the first changes to the first managed computer system for first change impact assessment, wherein the selected change has an associated first change time-stamp;

identifying first performance values from the plurality of performance values that have performance time-stamps that are prior in time to the time-stamp of the selected first change and associating the first performance values with a before-change category;

identifying second performance values from the plurality of performance values that have performance time-stamps that are later in time relative to the time-stamp of the selected first change and associating the second performance values with an after-change category;

determining second changes associated with the second managed computer system and storing, in a second data store, second change records corresponding to the determined second changes, wherein each of the second change records includes a respective change time-stamp indicating when each of the second changes was determined;

determining a plurality of performance values for the at least one performance metric associated with the second managed computer system for predetermined times and associating with the performance values a respective performance time-stamp;

selecting one of the second changes to the second managed computer for change impact assessment wherein the selected one of the second changes is the same as the selected one of the first changes, the selected one of the second changes having a second change time-stamp associated therewith; and determining second changes associated with the second managed computer system and storing, in a second data store, second change records corresponding to the determined second changes, wherein each of the second change records includes a respective change time-stamp indicating when each of the second changes was determined;

determining a plurality of performance values for the at least one performance metric associated with the second managed computer system for predetermined times and associating with the performance values a respective performance time-stamp;

selecting one of the second changes to the second managed computer for change impact assessment wherein the selected one of the second changes is the same as the selected one of the first changes, the selected one of the second changes having a second change time-stamp associated therewith;

determining a difference in time between the first change time-stamp and the second change time-stamp;

aligning the plurality of performance values for the at least one performance metric associated with the second managed computer system with the plurality of performance values for the at least one performance metric associated with first managed computer system by shifting performance time stamps of the second managed computer performance values by the determined difference in time generating an output comprising the first and second performance values wherein the first performance values associated with the before-change category are distinguished from the second performance values associated with the after-change category, to thereby allow a user to determine the performance impact of the selected change using the output.

15. The method of claim 14 wherein said aligning includes facilitating the isolation of the impact of a change that has occurred at different times for different managed computer systems.

16. The method of claim 14 further comprising categorizing the aligned performance values of the second managed computer system into one of the before-change category or the after-change category;

calculating a first plurality of composite performance values corresponding to the before-change category using the before-change category performance values associated with the first managed computer system and the before-change category aligned performance values of the second managed computer system;

calculating a second plurality of composite performance values corresponding to the after-change category using the after-change category performance values associated with the first managed computer system and the after-change category aligned performance values of the second managed computer system;

outputting the first plurality of composite performance values and the second plurality of composite performance values on the common timeline wherein the first plurality of composite performance values associated with the before-change category are distinguished from the second plurality of composite performance values associated with the after-change category.

17. The method of claim 16 wherein calculating the first and second plurality of composite performance values comprises determining an average of (i) the respective performance values of the first managed computer system and (ii) the respective, aligned performance values of the second managed computer system.

18. The method of claim 17 further comprises designating a time corresponding to the time-stamp of the selected first change to the first managed computer system as a reference time, wherein calculating the first and second plurality of composite performance values is performed for one day intervals in advance of and subsequent to the designated reference time.

19. A method for generating an output for facilitating assessment of a performance impact of a change in one or more managed computer systems, comprising:

determining first changes associated with at least a first managed computer system of the one or more managed computer systems and storing, in a first data store, first change records corresponding to the determined first changes wherein each of the first change records includes a respective first change time-stamp indicating when each change was determined;

determining a plurality of performance values for at least one performance metric associated with the first managed computer system for predetermined times and associating with each of the performance values a respective performance time-stamp;

selecting one of the first changes to the first managed computer system for first change impact assessment, wherein the selected change has an associated first change time-stamp;

identifying first performance values from the plurality of performance values that have performance time-stamps that are prior in time to the time-stamp of the selected first change and associating the first performance values with a before-change category;

identifying second performance values from the plurality of performance values that have performance time-stamps that are later in time relative to the time-stamp of the selected first change and associating the second performance values with an after-change category;

determining second changes associated with the second managed computer system and storing, in a second data store, second change records corresponding to the determined second changes, wherein each of the second change records includes a respective change time-stamp indicating when each of the second changes was determined;

determining a plurality of performance values for the at least one performance metric associated with the second managed computer system for predetermined times and associating with the performance values a respective performance time-stamp;

selecting one of the second changes to the second managed computer for change impact assessment wherein the selected one of the second changes is the same as the selected one of the first changes, the selected one of the second changes having a second change time-stamp associated therewith; and determining second changes associated with the second managed computer system and storing, in a second data store, second change records corresponding to the determined second changes, wherein each of the second change records includes a respective change time-stamp indicating when each of the second changes was determined;

determining a plurality of performance values for the at least one performance metric associated with the second managed computer system for predetermined times and associating with the performance values a respective performance time-stamp;

selecting one of the second changes to the second managed computer for change impact assessment wherein the selected one of the second changes is the same as the selected one of the first changes, the selected one of the second changes having a second change time-stamp associated therewith;

generating an output comprising the first and second performance values wherein the first performance values associated with the before-change category are distinguished from the second performance values associated with the after-change category, to thereby allow a user to determine the performance impact of the selected change using the output transmitting, for each one of the first and second managed computer systems, the first and second change records to a master computer system for consolidation in a condensed data store at the master computer system, wherein transmitting comprises filtering one or more of the first and second change records in accordance with a filtering strategy and not transmitting such filtered change records wherein the filtering strategy is configured to exclude changes that would be specific to either the first or second managed computer system or unlikely to be useful in finding performance issues among a population of managed computer system.

* * * * *